United States Patent [19]

Hirota et al.

[11] 4,356,489

[45] Oct. 26, 1982

[54] VEHICLE SPEED SENSING APPARATUS WITH ELECTROMAGNETIC WAVE INTERFERENCE DETECTOR

[75] Inventors: Yukitsugu Hirota, Yokohama; Akira Endo, Katsuta; Kenji Sekine, Tokyo, all of Japan

[73] Assignees: Hitachi, Ltd.; Nissan Motor Co., Ltd., both of Tokyo, Japan

[21] Appl. No.: 142,816

[22] Filed: Apr. 22, 1980

[30] Foreign Application Priority Data

Apr. 27, 1979 [JP] Japan ............................ 54/51493

[51] Int. Cl.³ .......................................... G01S 13/93
[52] U.S. Cl. .............................. 343/7 VM; 180/282
[58] Field of Search ............... 343/8, 7 VM; 180/282

[56] References Cited

U.S. PATENT DOCUMENTS

| | | | |
|---|---|---|---|
| 3,442,347 | 5/1969 | Hodgson et al. | 343/7 VM X |
| 3,701,568 | 10/1972 | Lewis et al. | 343/7 ED |
| 3,725,921 | 4/1973 | Weidman et al. | 343/7 VM |
| 3,760,415 | 9/1973 | Holmstrom et al. | 343/7 VM |
| 3,772,698 | 11/1973 | Furza | 343/7 VM |
| 3,889,259 | 6/1975 | Fukumori | 343/8 X |
| 3,918,058 | 11/1975 | Noyori et al. | 343/7 VM X |
| 4,143,370 | 3/1979 | Yamanaka et al. | 343/7 VM |
| 4,217,582 | 8/1980 | Endo et al. | 343/7 VM |
| 4,231,039 | 10/1980 | Fritzlen et al. | 343/8 |

*Primary Examiner*—Malcolm F. Hubler
*Attorney, Agent, or Firm*—Antonelli, Terry & Wands

[57] ABSTRACT

A vehicle speed sensing device comprises a Doppler radar unit for producing a Doppler signal related to the vehicle speed and producing a speed signal from the Doppler signal, a first section for extracting noise components in the Doppler signal and producing a noise detection signal, and a second section for producing an output signal of the vehicle sensing device. The device output is the speed signal from the Doppler radar unit when the noise detection signal is absent while the device output is null or a speed signal having an amplitude identical with that of the speed signal just before the appearance of the noise detection signal when the noise detection signal is present.

10 Claims, 10 Drawing Figures

VEHICLE SPEED SENSING APPARATUS WITH ELECTROMAGNETIC WAVE INTERFERENCE DETECTOR

This invention relates to appratuses mounted on vehicles for sensing vehicle speeds with respect to a vehicle traveling surface, in particular to those capable of preventing erroneous operations thereof due to electromagnetic interferences (apparatuses hereafter being referred to as vehicle speed sensing apparatus).

A vehicle speed sensing apparatus in accordance with the invention is effectve for use in a skid control apparatus, an electronic control device for transmission mechanism and an overspeed alarm apparatus as well as a speedometer in a driving room.

According to a principal aspect of the invention, undesirable infuences of electromagnetic wave interference on a vehicle speed sensing apparatus are prevented on the basis of the finding of the fact that the speed sensing apparatus in normal operation generates a Doppler signal having a frequency (a Doppler frequency) lower than the Doppler frequency corresponding to a maximum vehicle speed while a Doppler signal generated in the speed sensing apparatus under the influence of external wave interference contains very high frequency components (e.g., of the order of 1 MHz) due to a so-called "pulling " in which an oscillator in the speed sensing apparatus has its oscillation frequency pulled by the interference wave frequencies and on the basis of detection of the existence of such high frequency components contained in the Doppler signal generated in the vehicle speed sensing apparatus.

The invention will now be described by way of example only with reference to the accompanying drawings, in which:

FIG. 1 schematically illustrates an application of a vehicle speed sensing apparatus according to the invention to an automobile skid control system;

Figure 1:
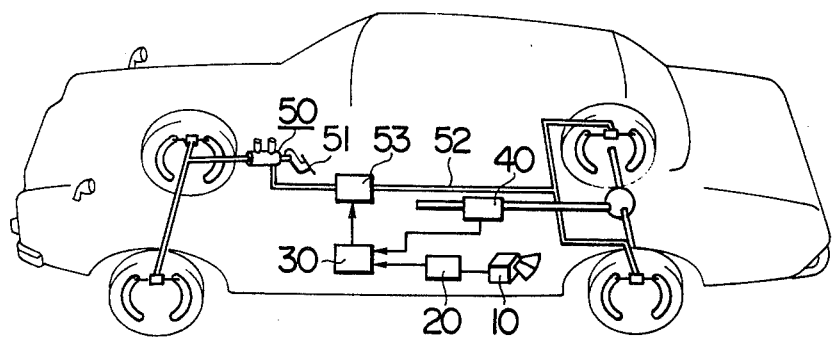

In FIG. 1 a vehicle speed sensing apparatus is applied to a skid control apparatus mounted on an automobile. It has been well known, e.g., from U.S. Pat. No. 3,094,693 issued to Daniel G. Taylor on June 18, 1963 or from U.S. Pat. No. 3,701,568 issued to Richard L. Lewis et al. on Oct. 31, 1972, that an extremely easy yet effective skid control for an automobile skid control system can be attained by the use of the result of detection of a vehicle speed of the automobile, utilizing the Doppler effects exercised on electromagnetic waves emitted from the antenna of a microwave Doppler radar mounted on the automobile to the ground and on those reflected therefrom to the radar antenna. In this case, however, an electromagnetic wave emitted from a transceiver carried on a car or from a powerfull radio station, if such exists, may interfere with the radar, causing a vehicle speed sensing apparatus to erroneously operate to deliver a vehicle speed signal indicative of a speed higher than the actual speed of the automoble. Since a skid control system is intended to control the braked wheel speed to make the latter amount to 70 to 90% of a vehicle speed to ensure effective brake characteristics, such an erroneous higher vehicle speed signal may result in inappropriate braking of the wheels and in the worst cases may make the brake totally inoperable.

In FIG. 1 a Doppler radar unit denoted by reference numeral 10 emits to the ground a radio frequency energy and receives radio frequency energy reflected from the ground and generates a Doppler signal for generating a vehicle speed signal representing a vehicle speed. The output from the radar unit is supplied to a skid control apparatus 30 through an electromagnetic wave interference avoiding apparatus 20. A device 40 is a wheel speed sensor for detecting a wheel speed. A brake means 50 comprises a brake pedal 51, a pipe 52 and an actuator 53. The skid control apparatus 30 compares the vehicle speed with the wheel speed and drives the actuator 53 to reduce the brake fluid pressure for less braking force when the vehicle speed is higher than the wheel speed, i.e., when the vehicle is regarded to be skidding. The apparatus 30 does not adjust the brake fluid pressure when the vehicle speed is less than the wheel speed, i.e., when the vehicle is regarded to be in a normal running condition.

Figure 2:
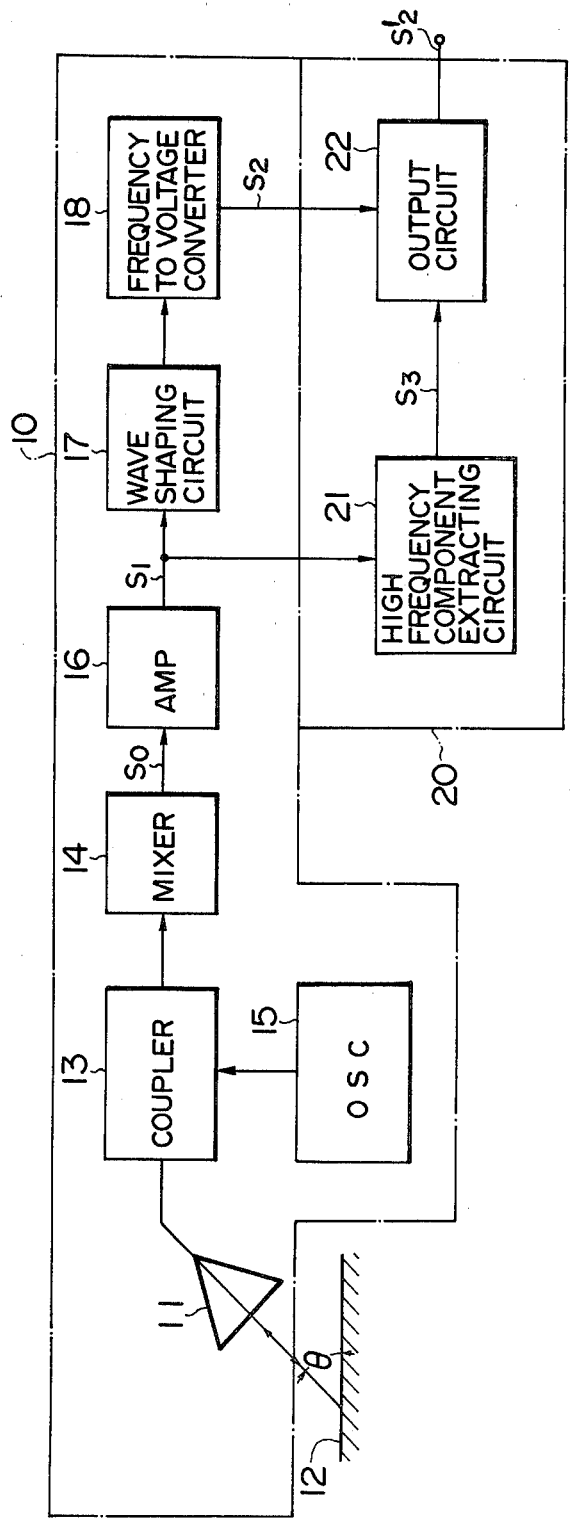
FIG. 2 is a block diagram showing the fundamental structure of the invention.
Figure 3:
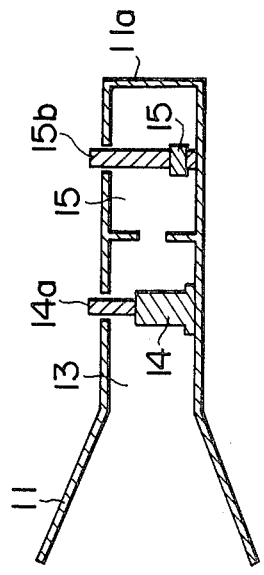
FIG. 3 illustrates an example of the structure of that portion of the Doppler radar unit shown in FIG. 2 which contributes to generation of a Doppler signal.

FIG. 2 is a block diagram illustrating a structure of the invention, in which the Doppler radar unit 10 and the electromagnetic wave interference avoiding apparatus 30 are both mounted on a running or traveling vehicle. A microwave directed to a road surface 12 at a fixed angle $\theta$ with respect to the surface 12 from the antenna 11 of the radar unit 10, is scattered at the road surface 12 and partly reflected back to the antenna 11 where the reflected wave undergoing a Doppler shift due to a relative motion between the vehicle and the road surface is received. The Doppler frequency $f_d$ in Hz is given by $$f_d = (2V/\lambda) \cos \theta$$

where V represents the vehicle speed (m/sec), $\theta$ represents the wave directing angle with respect to the road surface and $\lambda$ represents the wavelength (m). A coupler 13 is provided for allowing the single antenna 11 to both transmit and receive microwaves. A mixer 14 receives a portion of the wave transmitted from an oscillator 15 and a reflected wave given through the coupler 13 to generate a beat signal (a Doppler signal $S_0$) corresponding to the difference in frequency between these waves. Reference is now made to FIG. 3 showing an example of a structure including the antenna 11, the coupler 13, the mixer 14 and the oscillator 15. The oscillator 15 includes a wave guide 11a, a microwave oscillator diode 15a such as a Gunn diode and an electrode 15b to apply a voltage to the diode and generates a microwave having a predetermined freqency. The microwave thus generated passes through the coupler 13 and are radiated from the antenna 11. The diode mixer 14 is provided, as mentioned above, with a portion of the microwave generated. The reflected waves from the road surface are received by the antenna 11 and supplied to the mixer diode 14 in the coupler 13 which produces Doppler signals $S_0$ from the radiated and the reflected waves. Such a Doppler signal results in a Doppler signal $S_1$ after it is amplified by an amplifier 16. A portion of the Doppler signal $S_1$ is wave shaped by a wave shaping circuit 17 and further converted by means of a frequency-to-voltage converter 18 to a corresponding analog signal or a vehicle speed signal $S_2$, and is then transferred as an output signal $S_2'$ via an output circuit 22.

Another portion of the Doppler signal $S_1$ is fed to the electromagnetic wave interference avoiding circuit 20. As mentioned above, when the antenna 11 is under the influence of interfering electromagnetic waves, there takes place a pulling effect on the oscillator frequency of the oscillator 15. As a result, under such conditions Doppler signal $S_1$ contains very high frequency components. The second-mentioned portion of the Doppler signal $S_1$ is supplied to a high frequency component extracting circuit 21 which extracts interference noise components i.e. components having frequencies higher than the Doppler signal frequency corresponding to the maximum vehicle speed to generate a noise detection signal $S_3$. The noise detection signal $S_3$ is supplied to an output circuit 22. The vehicle speed signal $S_2$ of the Doppler radar unit 10 is "modified" according to the content of the signal $S_3$ and is then transmitted as the vehicle speed sensing apparatus output $S_2'$.

Figure 4:
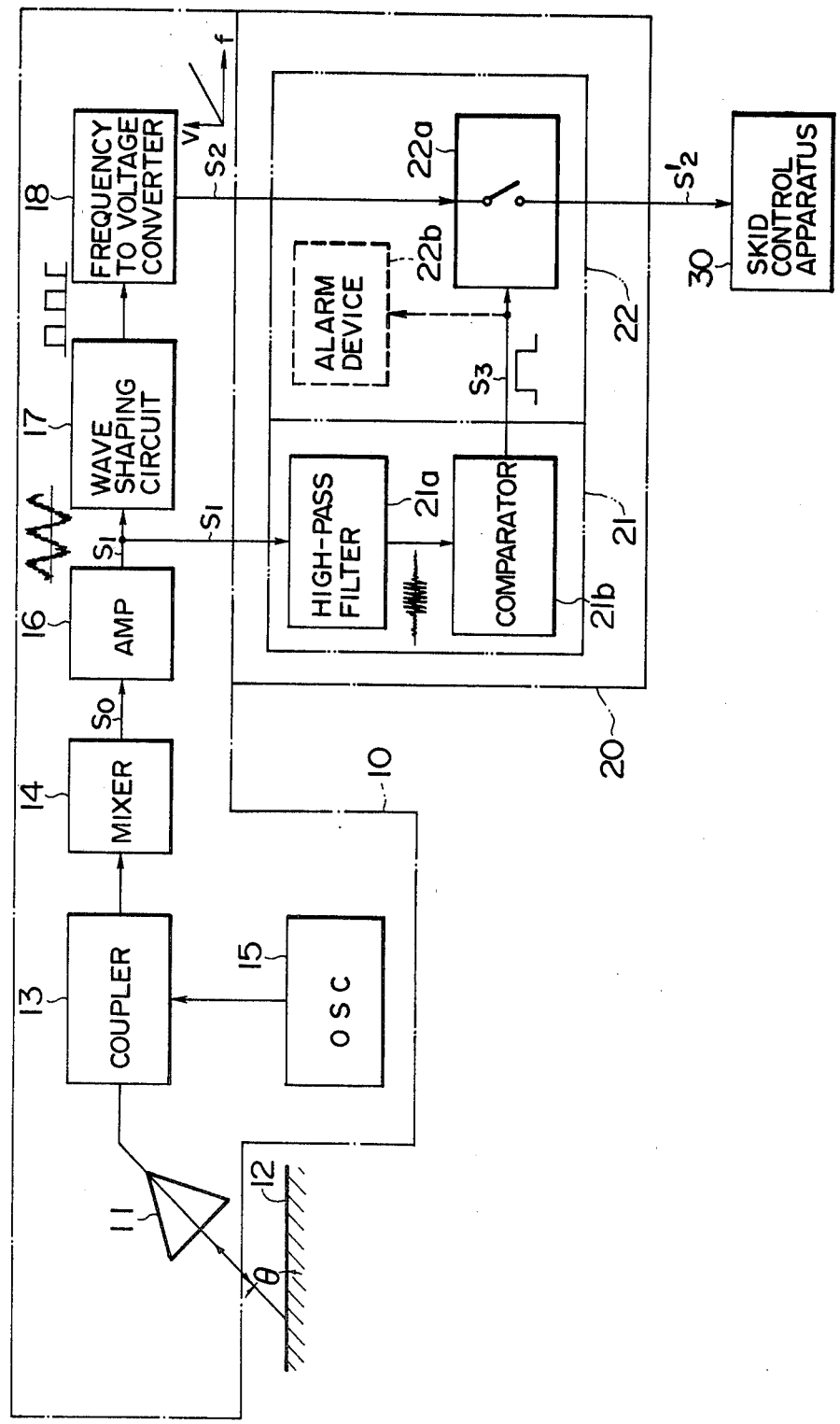
FIG. 4 is a block diagram of an embodiment of the invention.

Referring now to FIG. 4, an embodiment of the invention will be described below. For a better understanding, some waveforms are indicated at the corresponding portions of the blocks. Members in FIG. 4 identical with those in FIG. 2 are denoted by the same reference numerals. In this embodiment the invention is applied to a vehicle skid control. The Doppler radar unit 10 is the same in structure as that in FIG. 2 and needs no further description.

In the electromagnetic wave interference avoiding apparatus 20, a high frequency component extracting circuit 21 includes a high-pass filter 21a and a comparator 21b, while an output circuit 22 includes a gate circuit 22a. A portion of the Doppler signal $S_1$ from the Doppler radar unit 10 is fed to the high-pass filter. The cutoff frequency $f_c$ (Hz) of this filter is set at a Doppler frequency $f_{dmax}$ corresponding to the maximum vehicle speed $V_{max}$ as determined by $$f_{dmax} = 2V_{max} \cos \theta / \lambda.$$

For example, with $\lambda = 12.5$ mm, $\theta = 45°$ and $V = 150$ Km/hr, $f_{dmax}$ becomes 4.5 KHz. The comparator 21b detects the output of the filter 21a to generate a noise detection signal $S_3$. The gate circuit 22a of the output circuit 22 receives the vehicle speed signal $S_2$ from the converter 18 of the radar unit 10 and the noise detection signal $S_3$ from the comparator 21b.

When the radar unit 10 is free of any undesirable wave interferences and in normal operation, the filter 21a generates no output, thereby rendering the logical output level of the comparator 21b "9," so that the gate circuit 22a is left open (i.e. conductive) and the skid control apparatus 30 is provided with the apparatus output $S_2'$ resulting from the conduction of the analog signal $S_2$ through the conductive gate circuit 22a.

When the radar unit 10 is influenced by electromagnetic wave interference, the filter 21a yields an output which renders the logical output level of the comparator 21b "1," so that the gate circuit 22 is opened (i.e. non-conductive) to cut off the analog signal $S_2$, thereby nullifying the apparatus output signal $S_2'$ to be supplied to the skid control apparatus 30. As a result, the skid control apparatus 30 regards the vehicle speed zero and discontinues skid control. Thus, the brake for the vehicle is maintained in just the same operational conditions as a vehicle having no associated skid control apparatus, thereby avoding the worst situation of no brake even with the analog signal $S_2$ erroneously having a higher amplitude than the actual or true one due to electromagnetic wave interference. It may be considered that a vehicle speed previously recorded well before occurrence of an interference is used as a vehicle speed signal, at an occurrence of a wave interference, in place of the "zero" vehicle speed signal as in the described embodiment. However, such a recorded speed does not necessarily represent an appropriate vehicle speed, so that from the viewpoint of safety it is better to provide a zero signal and render the skid control apparatus inoperable.

Figure 5:
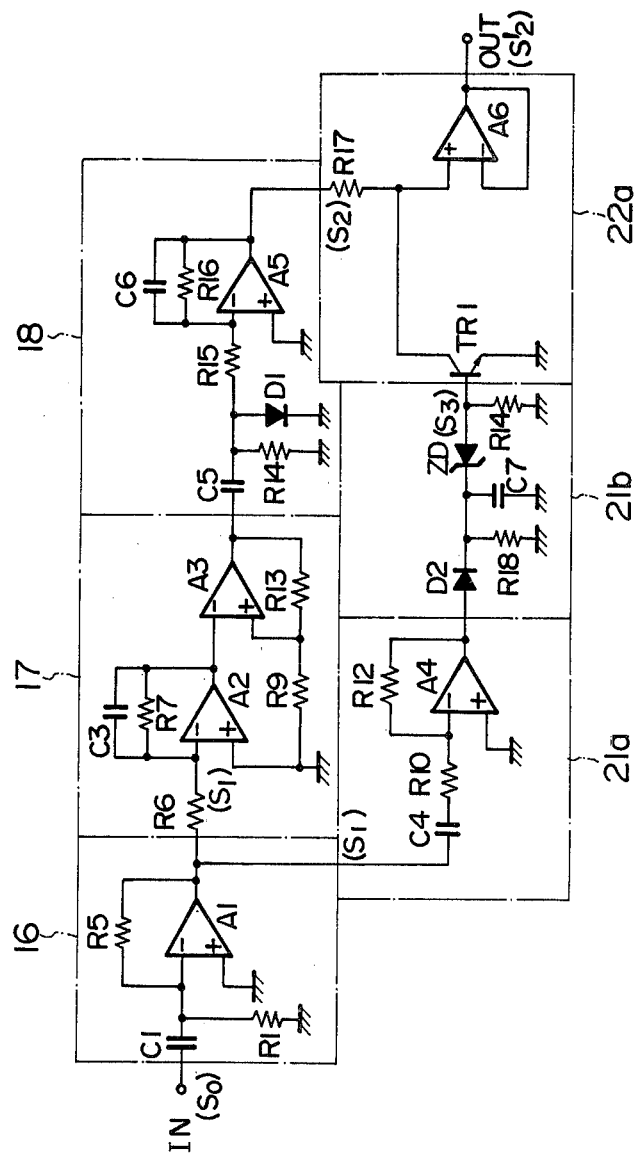
FIG. 5 illustrates a circuit construction for the embodiment shown in FIG. 4.

FIG. 5 shows a circuit construction of a portion of the radar unit 10 and of the electromagnetic wave interference avoiding apparatus 20 of FIG. 4. The circuit construction shown may be used in other systems than skid control apparatuses. A Doppler signal $S_0$ fed to an input terminal IN is amplified by an amplifier 16 including an operational amplifier A1 the output $S_1$ of which is divided into two portions. One of them is applied to an operational amplifier A2 forming a low-pass filter of a wave shaping circuit 17. The cutoff frequency of the low-pass filter is set in the neighborhood of a given Doppler frequency $f_{dmax}$, so that the operational amplifier A2 sufficiently amplifies the Doppler signal $S_1$ for further signal processing. This signal amplification by the operational amplifier A2 would not be necessary if the Doppler signal $S_1$ is sufficiently intense. The Doppler signal thus amplified is applied to a comparator comprising an operational amplifier A3 having a hysterisis characteristic, where the Doppler signal is converted to pulses intervals between which are inversely proportional to the frequency thereof, and the pulses are wave-shaped to those each having a definite pulse width by means of a network including a capacitor C5, a resistor R14 and a diode D1 in the frequency-voltage converter. The wave-shaped signals are then supplied to an incomplete integrator including an operational amplifier A5 which effects frequency-voltage signal conversion to provide analog voltage signal $S_2$ in proportion to the vehicle speed. The above described portion of the circuit has a general construction of a Doppler radar unit 10.

The circuitry for the electromagnetic wave interference avoiding apparatus 20 will now be described below. The branching portion of the Doppler signal $S_1$ mentioned above is delivered to a high-pass filter 21a including an operational amplifier A4. The cutoff frequency of this high-pass filter is set at the given Doppler frequency $f_{dmax}$. No signal will appear at the output of the filter when the radar unit 10 is in normal operation without being subject to electromagnetic wave interference. When, however, the unit is subject to an electromagnetic wave interference a large noise voltage is generated at the output of the filter 21a, which is envelope-detected by a subsequent comparator 21b including a diode D2, a resistor R18 and a capacitor C7.

When the output (noise voltage) becomes large enough to exceed the Zener voltage of a Zener diode ZD, the diode ZD turns on a transistor TR1 of a gate circuit 22a. In this case, the analog voltage signal, i.e. the vehicle speed signal $S_2$ from the frequency-voltage converter 18 (from the operational amplifier A5) undergoes a voltage drop through the resistor R17, so that no signal is transferred to a buffer constituted by an operational amplifier A6. This renders the amplitude of the vehicle speed sensing apparatus output signal $S'_2$ to be applied to a skid control apparatus 30 always null, thereby having the skid control apparatus inoperative. In other words, the apparatus regards the speed of the vehicle to be zero, where the vehicle speed is lower than the wheel speed as in a normal traveling or running condition, thereby bringing the skid control apparatus into an inoperative state.

Figure 6:
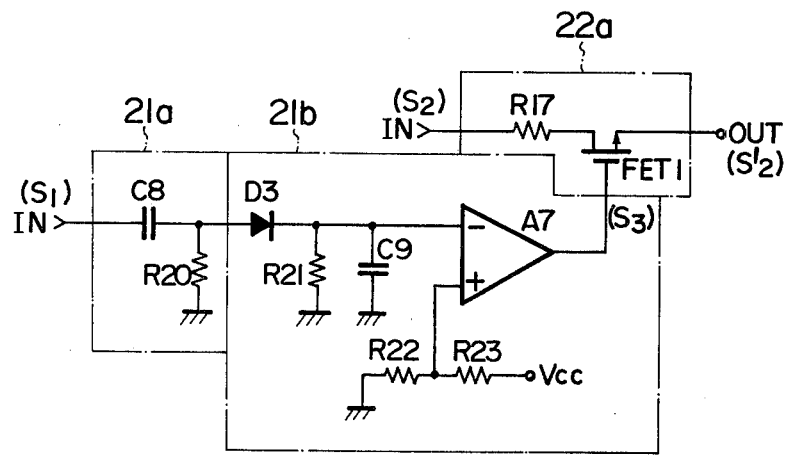
FIG. 6 illustrates another circuit construction for the embodiment shown in FIG. 4.

FIG. 6 shows another circuit construction of the electromagnetic wave interference avoiding apparatus 20 shown in FIG. 4. This circuitry is, like the one of FIG. 5, also applicable to those other than skid control apparatuses. As compared with the circuit construction shown in FIG. 5, this is more simplified in structure by the use of: a high-pass filter 21a including a resistor R20 and a capacitor C8; a comparator circuit 21b for generating noise detection signal $S_3$ including a diode D3, a resistor R21, a capacitor C9 (corresponding to D2, R18, and C7 of FIG. 5), along with an operational amplifier A7 replacing a Zener diode and resistors R22 and R23 providing a reference voltage source; and a gate circuit 22a including a field-effect transistor FET1 and a resistor R17. In this circuitry the gate circuit 22a may alternately be replaced by an analog switch in the form of IC comprising an FET.

Figure 7:
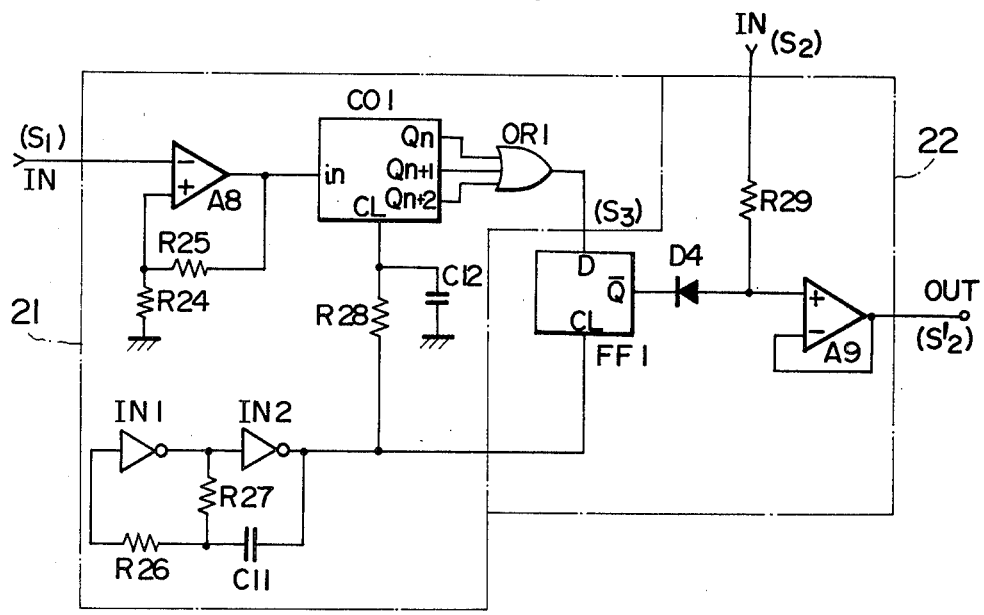
FIG. 7 is a circuit diagram of a main portion of another embodiment of the invention.

FIG. 7 is a circuit diagram of a main portion of another embodiment of the invention, mainly illustrating a structure of the electromagnetic wave interference avoiding apparatus 20 shown in FIG. 2. The high frequency component extracting circuit 21 is a frequency comparator and an output circuit 22 is a gate circuit which functions similarly to the gate circuit 22a of FIG. 4. In the circuit 21 the Doppler signal $S_1$ from the amplifier 16 (FIG. 2) of the radar unit 10 is converted to a pulse train signal to be counted by a counter C01, by means of the hysterisis comparator including resistors R24 and R25 and an operational amplifier A8. A multivibrator consisting of inverters IN1 and IN2, resistors R26 and R27 and a capacitor C11 is provided for setting up a counting period required for the counter C01 to count the pulses from the hysterisis comparator. The clock signal for the counter is applied to a terminal CL of the counter C01 through a resistor R28. A capacitor C12 is provided for constituting a delay circuit along with the resistor R28. The counter C01 is designed to generate an output only when a count during the above-mentioned period exceeds a predetermined count QN, which output is applied, through an OR circuit OR1, to a D input terminal of a D-flip-flop circuit FF1 in the output circuit 22. The D-flip-flop circuit FF1 receives a clock signal delivered to the CL input terminal from the above-mentioned multivibrator and, upon reception of the output of the counter C01, yields at its output terminal $\overline{Q}$ a low level output or a "0" logical level output. Here, it should be noted that the clock signal to the CL terminal of the counter C01 is delayed with respect to the clock signal to the CL terminal of the flip-flop circuit FF1 by the above-mentioned delay circuit consisting of the capacitor C12 and the resistor R28 in order to prevent the possibility of the counter C01 from being cleared before operation of the flip-flop circuit FF1 due to simultaneous supply of the clock signals to the counter C01 and the flip-flop circuit FF1. As a result, the diode D4 blocks the vehicle speed signal $S_2$ from reaching an operational amplifier A9, the signal being otherwise supplied to the amplifier through a resistor R29. Accordingly, the output signal $S'_2$ of the vehicle speed sensing apparatus becomes null.

Figure 8:
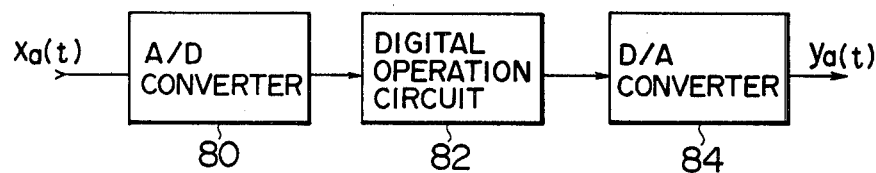
FIG. 8 is a block diagram of a digital filter which may be used in the embodiment shown in FIG. 4.

As a filter 21a for the embodiment shown in FIG. 4, a digital filter shown in FIG. 8 may be employed. The filter includes the A/D converter 80 for converting an analog signal $x_a(t)$ to a digital signal, a digital operation circuit 82 to perform computer processing to get desired filter characteristics and a D/A converter 84 for converting the digital output signal from the circuit 82 back to an analog signal $y_a(t)$. Such a digital circuit can be used also in the low-pass filter portion of the wave shaping circuit 17 shown in FIG. 5.

Figure 9:
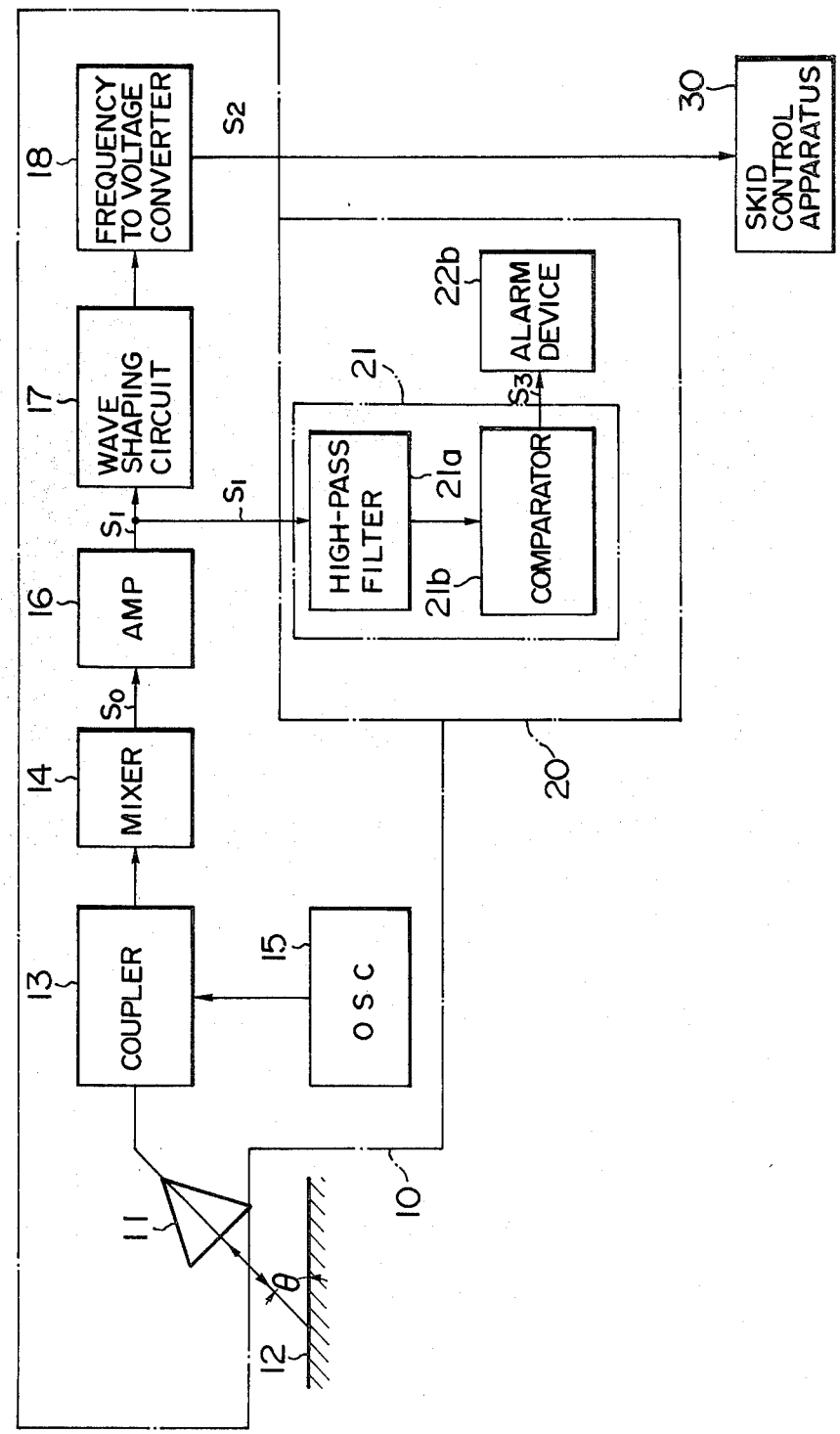
FIG. 9 is a block diagram of a further embodiment of the invention.

FIG. 9 is a block diagram of a further embodiment according to the invention, which is similar to the one shown in FIG. 4 and differs therefrom in that in FIG. 9 an alarm device 22b is inserted instead of the gate circuit 22a of FIG. 4. Thus, this embodiment is adapted to give the driver a warning or an alarm by means of the alarm device 22b (e.g. a buzzer or a lamp) when the radar unit 10 is influenced by an electromagnetic wave interference, thereby informing the driver of possible danger such as of an inoperable brake condition to enable him to take necessary measures to avoid accidents, for example, removal of interfering wave sources such as transceivers or cautious steering. It is apparent that the gate circuit 22a and the alarm device 22b may be made simultaneously provided as shown by the dotted line in FIG. 4.

The embodiments described above are capable of avoiding possible erroneous control, which uses the output of the vehicle speed sensing apparatus on a vehicle subjected to undesirable influence of electromagnetic wave interference, by nullifying the output of the vehicle speed sensing apparatus and/or warning the driver of underlying abnormalities only during a time when such influence exists. For instance, when the invention is applied to a skid control, it avoids brakeless conditions otherwise encountered under such electromagnetic wave interference, by stopping the operation of the skid control system and/or warning the driver of such abnormal conditions.

Figure 10:
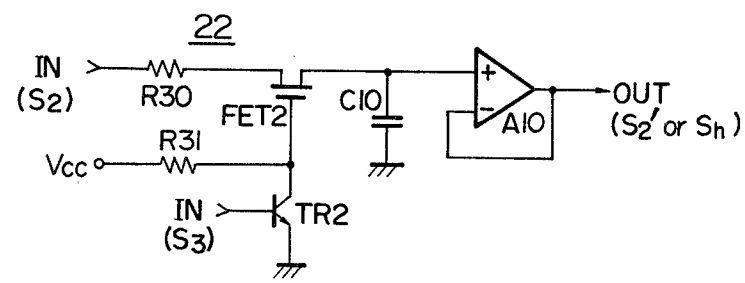
FIG. 10 is a circuit diagram of a main portion of a still further embodiment of the invention.

FIG. 10 illustrates a main portion of the circuit of a still further embodiment of the invention, i.e., an output circuit 22 of the electromagnetic wave interference avoiding apparatus 20 shown in FIG. 2. The output circuit 22 is a holding circuit, in which a noise detection signal $S_3$ from the high frequency component extracting circuit 21, obtained under electromagnetic wave interference, makes a transistor TR2 conductive to ground the gate of a field-effect transistor FET2, which renders the transistor FET2 non-conductive. Accordingly a capacitor C10 holds the voltage corresponding to the amplitude of the vehicle speed signal $S_2$ provided from the converter 18 of the Doppler radar unit 10 through a resistor R30 and the transistor FET2 just before the electromagnetic wave interference. Thus, a signal is produced, as an output signal $S_h$ of the vehicle speed sensing apparatus, from an operational amplifier A10 corresponding to the above voltage across the capacitor C10. Upon disappearance of the noise detection signal $S_3$, the transistor TR2 becomes non-conductive while the field-effect transistor FET2 becomes conductive by a potential applied to its gate through a resistor R31, so that the terminal voltage of the capacitor C10 yields a signal $S_2'$ which varies in response to a vehicle speed signal $S_2$. According to this embodiment, a vehicle speed signal approximating to an actual vehicle speed can be continually provided even under electromagnetic wave interference, the embodiment can be employed in an electronic control device for transmission mechanism, an overspeed alarm device, and/or a speedometer installed in a driving room.

Further, a vehicle may be provided with two vehicle speed sensing apparatuses according to the invention, one located at a front portion of the vehicle, the other located at a rear portion.

What we claim is:

1. A vehicle speed sensing apparatus comprising:
   a Doppler radar unit for a vehicle including means for directing RF energy to a vehicle traveling surface and for receiving reflected RF energy from the surface to produce a Doppler signal related to the speed of the vehicle and means for producing a speed signal from the Doppler signal;
   an interference avoidance circuit including means connected with the radar unit for extracting high frequency components from the Doppler signal, the high frequency components being representative of noise contained in the Doppler signal and having frequencies higher than the frequency of a Doppler signal corresponding to a maximum vehicle speed, and means for producing from said extracted components a noise detection signal; and
   output means connected for reception of the speed signal from the radar unit and the noise detection signal from the interference avoidance circuit for delivering a first output signal independent of the Doppler signal when the noise detection signal is present and a second output signal corresponding to said speed signal from the radar unit when the noise detection signal is absent.

2. An apparatus according to claim 1, in which said output means includes a gate circuit which is conductive to transfer and deliver said speed signal from said radar unit as said second output signal responsive to the absence of the noise detection signal and is non-conductive to stop said speed signal from said radar unit and deliver a zero amplitude signal as said first output signal responsive to the presence of the noise detection signal.

3. An apparatus according to claim 1, in which said output means includes means for holding, during presence of a noise detection signal, the amplitude of said speed signal just before the appearance of said noise detection signal, said held speed signal being provided as said first output signal, and said speed signal during the absence of the noise detection signal being said second output signal.

4. An apparatus according to claim 1, 2 or 3, in which said extracting and producing means includes a high-pass filter having a cutoff frequency corresponding to said Doppler signal frequency corresponding to a maximum vehicle speed and means responsive to the output of said filter for producing said noise detecting signal.

5. An apparatus according to claim 4, in which said filter is constituted by a digital filter.

6. An apparatus according to claim 1, 2 or 3, in which said extracting and producing means includes a frequency comparator.

7. An apparatus according to claim 1 or 2, further comprising an alarm device connected with said extracting and producing means for generating an alarm.

8. A vehicle speed sensing apparatus for use in skid control, comprising:
   a Doppler radar unit for a vehicle including means for directing RF energy to a vehicle traveling surface and for receiving reflected RF energy from the surface to produce a Doppler signal related to the speed of the vehicle and means for producing a speed signal from the Doppler signal;
   a high-pass filter having a pass band which is above the frequency of a Doppler signal corresponding to a maximum vehicle speed, the filter being connected with the radar unit for extracting noise components from the Doppler signal to produce a noise detection signal therefrom; and
   output means including a gate circuit connected for reception of the speed signal and operative to deliver the speed signal as an output to a skid control means when the noise detection signal is absent and to stop the speed signal to make the skid control means inoperative when the noise detection signal is fed to the gate circuit.

9. An apparatus according to claim 3, further comprising an alarm device connected to the high-pass filter for producing an alarm.

10. A vehicle speed sensing apparatus for use in skid control, comprising:
    a Doppler radar unit for a vehicle including means for directing RF energy to a vehicle traveling surface and for receiving reflected RF energy from the surface to produce a Doppler signal related to the speed of the vehicle and means for producing a speed signal from the Doppler signal to be supplied as an output to a skid control means;
    a high-pass filter having a pass band which is above the frequency of a Doppler signal corresponding to a maximum vehicle speed, the filter being connected with the radar unit for extracting noise components from the Doppler signal to produce a noise detection signal therefrom; and
    an alarm device connected with the noise signal producing means for generating an alarm.

* * * * *